(12) United States Patent
Sattler

(10) Patent No.: US 8,057,093 B2
(45) Date of Patent: Nov. 15, 2011

(54) DOUBLE TEMPERATURE SENSOR WITH A RECEIVING ELEMENT

(75) Inventor: Frank Sattler, Lübeck (DE)

(73) Assignee: Dräger Medical Center, Lübeck (DE)

( * ) Notice: Subject to any disclaimer, the term of this patent is extended or adjusted under 35 U.S.C. 154(b) by 342 days.

(21) Appl. No.: 12/469,055

(22) Filed: May 20, 2009

(65) Prior Publication Data
US 2009/0296773 A1 Dec. 3, 2009

(30) Foreign Application Priority Data
Jun. 3, 2008 (DE) .......................... 10 2008 026 642

(51) Int. Cl.
*G01K 1/16* (2006.01)
*G01K 1/00* (2006.01)
*A61B 5/01* (2006.01)
*A61G 11/00* (2006.01)

(52) U.S. Cl. ........ 374/100; 374/110; 374/166; 374/208; 374/E13.002; 374/E1.021; 600/549

(58) Field of Classification Search ............ 374/100, 374/110, 112, 166, 183, 194, 204, 208, E3.006, 374/E3.009, E13.002, E1.001, E1.021, E1.022; 600/474, 549; 702/130, 131
See application file for complete search history.

(56) References Cited

U.S. PATENT DOCUMENTS

| | | | |
|---|---|---|---|
| 5,560,711 A * | 10/1996 | Bu | 374/109 |
| 6,220,750 B1 | 4/2001 | Palti | |
| 7,299,090 B2 | 11/2007 | Koch | |
| 7,625,117 B2 * | 12/2009 | Haslett et al. | 374/111 |
| 7,789,554 B2 * | 9/2010 | Sattler et al. | 374/110 |
| 2005/0141591 A1 * | 6/2005 | Sakano | 374/163 |
| 2010/0121217 A1 * | 5/2010 | Padiy et al. | 600/549 |
| 2010/0292605 A1 * | 11/2010 | Grassl et al. | 600/549 |

FOREIGN PATENT DOCUMENTS

| | | |
|---|---|---|
| DE | 2 329 164 | 1/1974 |
| DE | 100 38 247 C2 | 5/2001 |
| DE | 102007002369 | 5/2008 |

* cited by examiner

*Primary Examiner* — Amy Cohen Johnson
(74) *Attorney, Agent, or Firm* — McGlew and Tuttle, P.C.

(57) ABSTRACT

A double temperature sensor with a receiving element for measuring a near-surface temperature of the ambient air and the skin surface. The double temperature sensor with a receiving element includes an insulating block, two temperature sensors and a receiving element. At least the receiving element (8) and/or the insulating block (4) are designed in terms of the material structure such that the horizontal heat conduction is low compared to the vertical heat conduction.

23 Claims, 7 Drawing Sheets

DOUBLE TEMPERATURE SENSOR WITH A RECEIVING ELEMENT

CROSS REFERENCE TO RELATED APPLICATIONS

This application claims the benefit of priority under 35 U.S.C. §119 of German Patent Application DE 10 2008 026 642.6 filed Jun. 3, 2008, the entire contents of which are incorporated herein by reference.

FIELD OF THE INVENTION

The present invention pertains to a double temperature sensor with a receiving element.

BACKGROUND OF THE INVENTION

Double temperature sensors are used to detect a first skin surface temperature of a living being and a second temperature of an environment. Two temperature measuring sensors in a closed sensor housing are located at spaced locations from one another in a heat-insulated manner in DE 10038247 C2. Using heat balance equations, the temperature near the body of a living being is determined from the two temperature values of the two temperature sensors. The double temperature sensors of this type are used, for example, in the control of a thermotherapy device for newborns and in the detection and monitoring of the body temperature in respirator products. The double temperature sensor is arranged on the skin of a living being, for example, on the head of a fireman or on the abdomen of a newborn by means of adhesive strips adhering on one side, the double temperature sensor being placed centrally under the adhesive strip and the adhesive surfaces being connected to be skin adhesively all around the double temperature sensor. In addition to the adhesive layer, an air-permeable textile layer is arranged in the adhesive strip in many cases.

The drawback of such an adhesive connection is that central placement of the double temperature sensor is not ensured with certainty in all cases, on the one hand, and heat is additionally removed laterally by the adhesive strip, on the other hand. The lateral removal of heat affects the boundary conditions for the use of the heat balance equations. A process for compensating the lateral heat fluxes by calculation is known from U.S. Pat. No. 7,299,090.

However, the use of compensation by calculation presupposes limited and known boundary conditions, for example, knowledge of the ambient temperature range, which is not given in all cases of application.

SUMMARY OF THE INVENTION

Based on this, the basic object of the present invention is to perfect a double temperature sensor such that the heat losses are reduced.

According to the invention, a double temperature sensor is provided with a receiving element, suitable for detecting a skin surface temperature and an ambient temperature. The double temperature sensor with a receiving element comprises a receiving element and an insulating block defining a sensor housing. A first temperature sensor is arranged in the insulating block for detecting a skin temperature. A second temperature sensor arranged in the sensor block for detecting an outer-side ambient temperature. At least one of the receiving element or the insulating block defines an anisotropic heat conduction material structure.

The anisotropy of the heat conduction of the an anisotropic heat conduction material structure may advantageously provides lower radial heat conduction than axial heat conduction. As the sensor is often used with the first temperature sensor deployed below the second sensor, the preferred anisotropy of the heat conduction of an anisotropic heat conduction material structure provides lower horizontal (radial) heat conduction than vertical (axial) heat conduction.

The advantages obtained with the present invention are especially that the error effect due to the inhomoheneity of the heat fluxes can be minimized by the receiving element in the double temperature sensor according to the present invention. Two temperature sensors are arranged in an insulating block in a double temperature sensor vertically one on top of another such that a first temperature sensor is designed to detect a skin temperature and a second temperature sensor is designed to detect a temperature near the environment.

The double temperature sensor is embedded in a receiving element.

The material of the receiving element and/or of the insulating block has different structures in the vertical extension and in the horizontal extension. It is guaranteed hereby that the horizontal heat conduction is low compared to the vertical heat conduction. The propagation of the heat flux in the vertical and horizontal directions of flow is controlled by the embedding of the double temperature sensor in the receiving element according to the present invention, the principal component of the heat flux flowing vertically from the skin surface over the surface of the double temperature sensor to the upper-side environment and flowing through in the process in the interior of the insulating block at first through the first skin temperature sensor and subsequently through the second ambient temperature sensor. Another part of the vertical heat flux flows vertically through the receiving element in parallel to the insulating block. The anisotropy of the heat conduction in the material of the receiving element causes the sum of the relative area-related vertical heat fluxes in the receiving element to be on the same order of magnitude as the relative area-related vertical heat flux in the insulating block and the temperature gradient detected by the two temperature sensors in the interior of the insulating block is thus also on the same order of magnitude as the temperature gradient over the receiving element. The anisotropy of the heat conduction reduces the error effect of the lateral heat flux in the heat balance equations due to a reduction of the lateral heat flux itself. The anisotropy of the heat conduction is thus achieved by forming a structuring of the receiving element.

Structuring can be preferably brought about in such a way that after presetting the dimensions of the insulating block and of the receiving element, including the heat transfer coefficient and the thermal conductivity of the materials of the insulating block and of the basic material of the receiving element, a number of ring-shaped grooves are prepared concentrically to the center of the insulating block, which grooves are filled with a material, whose thermal conductivity is lower than that of the basic material of the receiving element. The material filling out the grooves may be gaseous, for example, air, but also solid, porous or viscous. The number and dimensioning of the ring-shaped grooves depend, besides on the preset dimensions and material properties, on the intended degree of anisotropy.

The anisotropy of the heat conduction in the receiving element is preferably designed such that the horizontal heat transfer coefficient is made lower than the vertical heat transfer coefficient by a factor of 2 to 20.

The anisotropy of the heat conduction in the insulating block is preferably designed such that the horizontal heat transfer coefficient is made lower than the vertical heat transfer coefficient by a factor of 2 to 20.

In a preferred embodiment, anisotropy of the thermal conductivity in the receiving element is achieved by a group of vertical boreholes, as a result of which the horizontal heat conduction is lower than the vertical heat conduction, because the horizontal heat conduction is reduced by the lower thermal conductivity of air compared to the thermal conductivity of the foam-like material of the receiving element. A lower-side adhesive layer and an upper-side insulating layer on the receiving element prevent a possible movement of air in the boreholes, which would otherwise compromise the insulating action of the air.

A plurality of ring-shaped grooves are prepared radially symmetrically in the receiving element instead of the boreholes in another embodiment variant. Uninterrupted concentric circles may be prepared in the receiving element as embodiment variants of the grooves, and a combination of grooves and support struts is another variant. The support struts are preferably made of the material of the receiving element, and the support struts are prepared as additional elements in the receiving element, or they may also be embossed as parts of the receiving element itself.

A number of concentric grooves are advantageously arranged interspersed with the support struts in the receiving element such that the horizontal heat flux away from the insulating block cannot flow off in the direct and straight direction along the support struts from the center of the insulating block to the edge of the receiving element. An extensively homogeneous area distribution of the horizontal heat flux is thus achieved in the receiving element.

The boreholes or the ring-shaped grooves are preferably filled with a material whose thermal conductivity is lower than the thermal conductivity of the receiving element. The filling material in the boreholes or grooves is characterized by a low thermal conductivity in the range of 0.01 W/mK to 0.1 W/mK. The filling material may be gaseous, for example, air, but also solid, porous or viscous.

At least two different materials may be used to fill the grooves or boreholes in a preferred embodiment. It is thus possible to design the receiving element in terms of strength and flexibility. When the thermal conductivities of the filling materials used are different from one another, the anisotropy of the heat conduction can likewise be designed hereby.

In a preferred embodiment, the receiving element is made of a material that is characterized by a low thermal conductivity in the range of 0.05 W/mK to 0.3 W/mK. A preferred material for the receiving element is polyethylene (PE); other material variants for the receiving element are polyether ether ketone (PEEK), polymethyl methacrylate (PMMA), closed-cell, porous or foam-like insulating materials, such as silicones, rubber or rubberized foams.

In another preferred embodiment, the insulating block is made of a material that is characterized by a low thermal conductivity in the range of 0.05 W/mK to 0.3 W/mK. A preferred material for the insulating block is polyether ether ketone (PEEK); other materials are polyethylene (PE), polymethyl methacrylate (PMMA), polycarbonate (PC) or polysulfone (PSU).

The present invention is schematically shown in the drawings 1 through 8 on the basis of exemplary embodiments and will be described below in detail with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
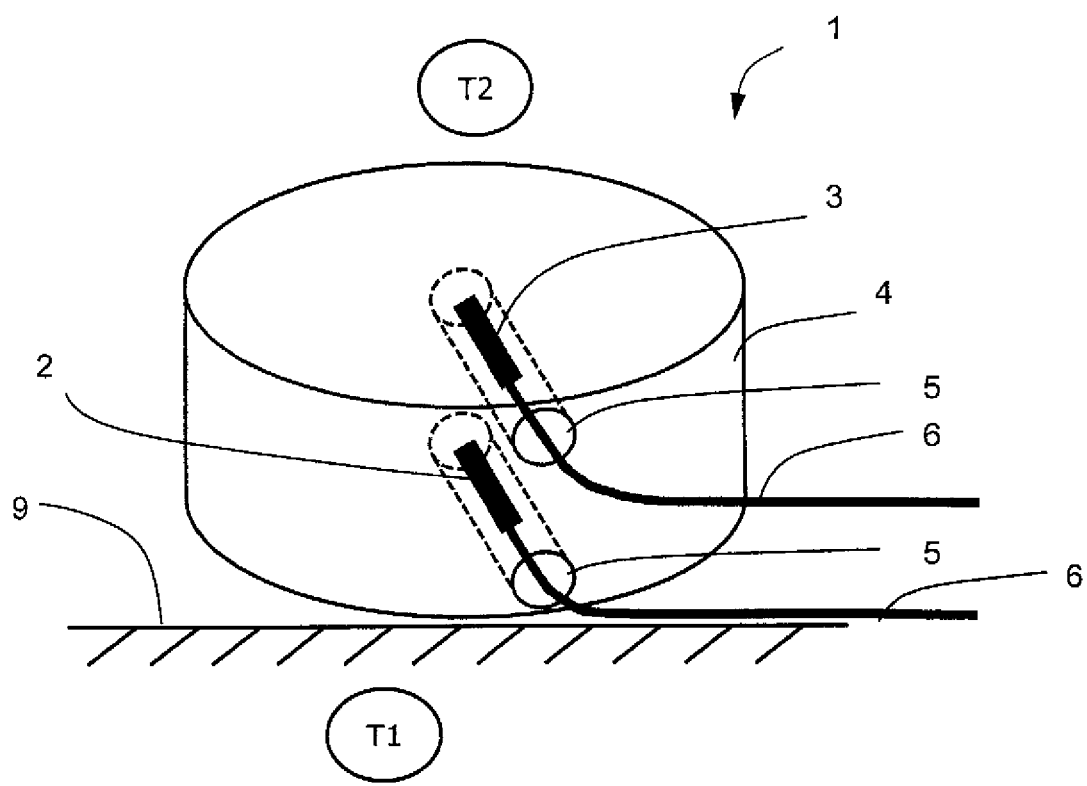
FIG. 1 is a perspective view of a cylindrical design of a double temperature sensor that is used in combination with other structure to form the double temperature sensor with receiving element according to the invention.

Referring to the drawings in particular, FIG. 1 shows a perspective view of a cylindrical embodiment of a double temperature sensor 1 that is itself known from the according to the state of the art. The double temperature sensor 1 has an insulating block 4 forming a housing. Two temperature sensors 2, 3 are introduced into the insulating block 4 vertically one on top of another, each close to the surface, so that the first temperature sensor 2 detects the skin temperature T1 by sensing and the second temperature sensor 3 detects the environment temperature T2 by sensing. The insulating material of the insulating block 4 is characterized by a thermal conductivity between 0.05 W/mK and 0.3 W/mK. The insulating material of the insulating block 4 may also be varied as to structure and material content to provide insulating block that are formed in terms of the material structure such that an anisotropic heat conduction is present.

Figure 2:
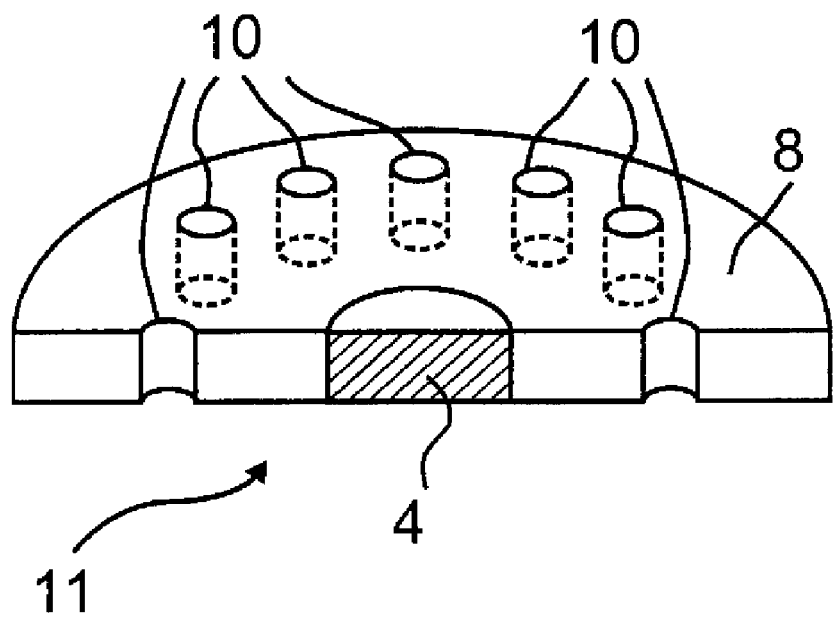
FIG. 2 is a half section of the double temperature sensor according to the present invention including features according to FIG. 1 with a structured receiving element.

According to the invention, an insulating block 4 (with or without anisotropic heat conduction properties) is combined with a receiving element 8 as shown in FIG. 2. The electrical connections 6 of the temperature sensors 2, 3 are led out of the insulating block 4 to the receiving element 8 (FIG. 2) and may be led to the outside in a straight line, helically, circularly, in a meandering, zigzag- or star-shaped manner in the form of a polygon on the underside in the receiving element 8. The electrical connections 6 are preferably embedded in a slot provided for that purpose in the receiving element 8. The temperature sensors 2, 3 are preferably temperature-dependent, resistive elements, preferably of an identical design, such as NTC or PTC elements, for example, platinum temperature sensors.

A temperature T1 proportional to the skin surface 9 is detected by the first temperature sensor 2 and a temperature T2 proportional to the ambient air is detected by the second temperature sensor 3.

For using the double temperature sensor 1 to measure a temperature near the body of a human being, the underside surface of the insulating block 4, which is intended for adaption to the skin surface 9, is designed such that it is arched preferably towards the skin surface for optimal heat transfer of the skin temperature to the temperature sensor element 2.

FIG. 2 shows a perspective half section of a first arrangement 11 of a double temperature sensor with the insulating block 4 and with the receiving element 8, which surrounds the insulating block 4 in the radial direction. The receiving element 8 is used for lateral (radial) temperature insulation. Corresponding to the use of the double temperature sensor 1, the material of the receiving element 8 may be made different from the material of the insulating block 4, for example, from a porous or foam-like material. The temperature sensor in the insulating block 4 and the electrical connection, as well as the skin surface are not shown in FIG. 2.

At least one of the thermal conductivities of the materials of the receiving element 8 and of the insulating block 4 has an anisotropy between the vertical (axial) direction and the horizontal (radial) direction, the anisotropy being formed such that the horizontal heat conduction is low compared to the vertical heat conduction. The anisotropy of the heat conduction in the receiving element is brought about by a group of boreholes 10, which are arranged concentrically around the insulating block 4 housing the temperature sensors 2, 3.

Figure 3:
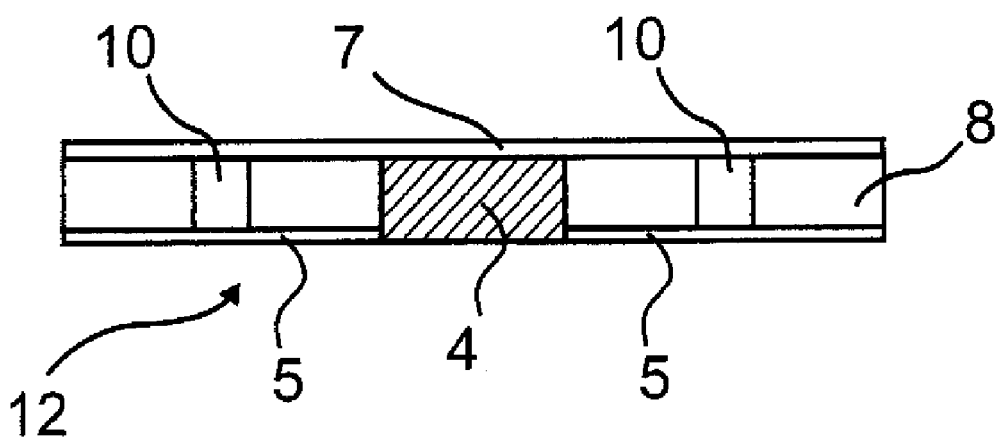
FIG. 3 is a cross section through the double temperature sensor according to the present invention and the receiving element with an additional insulating layer and with an adhesive layer.

A second arrangement 12 of a double temperature sensor with an insulating block 4, with a receiving element 8, with an insulating layer 7 and with an adhesive layer 5 is shown as a cross section as an expanded variant of the first arrangement 11 in an embodiment shown in FIG. 3.

Compared to the embodiment of the first arrangement 11 according to FIG. 2, the upper side of the receiving element 8, which side faces away from the skin surface 9, is additionally provided with a thin insulating layer 7 in the second arrangement 12 in order to prevent the measured signals from overshooting during a sudden temperature change. An adhesive layer 5, which makes it possible to arrange the second arrangement 12 of a double temperature sensor on the skin surface 9, is arranged on the receiving element 8 in a ring-shaped pattern on the underside. Furthermore, FIG. 3 shows a group of air-filled boreholes 10, by which the anisotropy of the thermal conductivity is designed such that the horizontal (radial) heat conduction is low compared to the vertical (axial) heat conduction, because the horizontal thermal conductivity acting as a whole is reduced by the lower thermal conductivity of air compared to the thermal conductivity of the receiving element 8 consisting of a foam-like material. An underside adhesive layer 5 and an upper-side insulating layer 7 at the receiving element 8 cover the boreholes 10 on both sides and prevent as a result a possible movement of air in the boreholes 10, on the one hand, and, on the other hand, the adhesive layer 5 is used to fasten the arrangement comprising the insulating block 4 and the receiving element 8 to the skin surface 9, and the insulating layer 7 is used as a protection against overshooting of the measured signal in case of a sudden temperature change.

Figure 4:
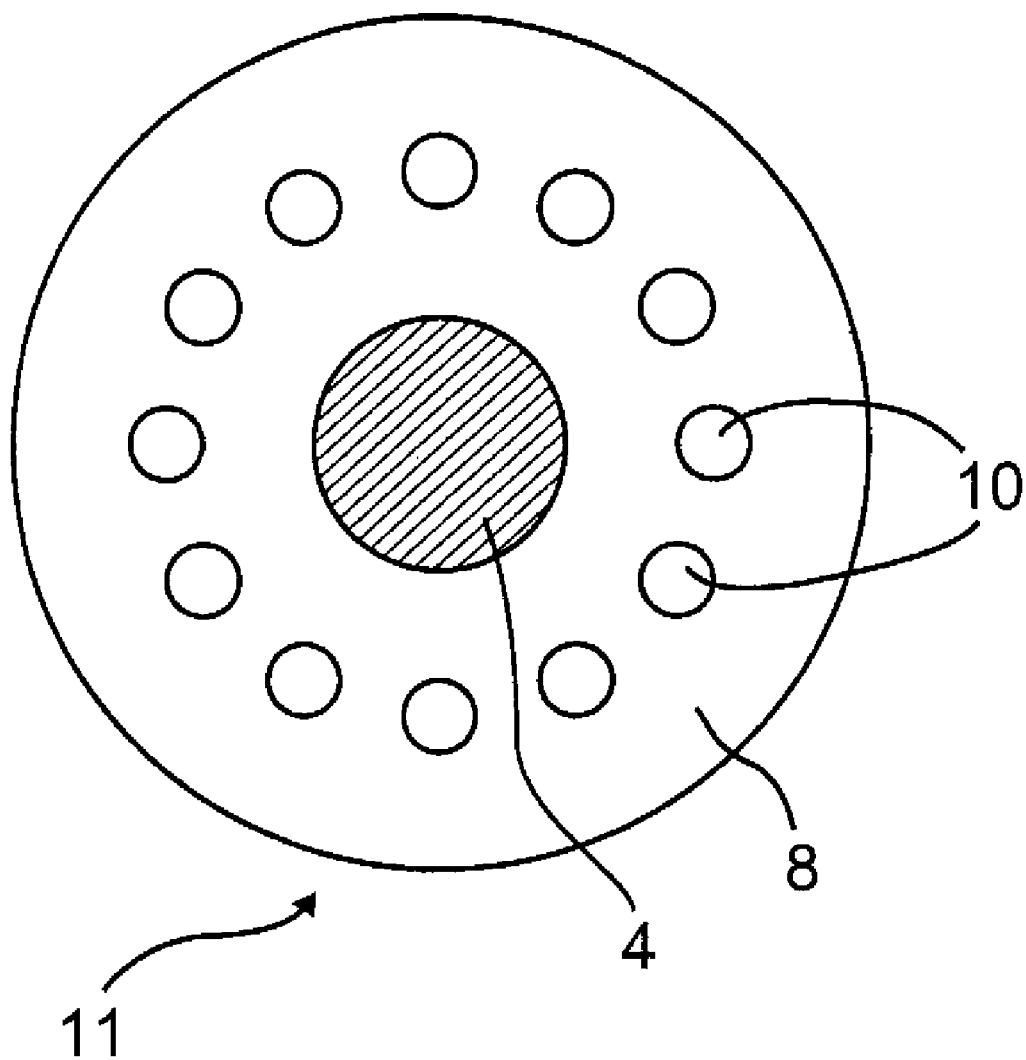
FIG. 4 is a top view of the arrangement according to FIG. 2.

FIG. 4 shows a top view of an arrangement 11 according to FIG. 2, where a group of 12 boreholes 10 is arranged radially symmetrically around the insulating block 4. The number of 12 boreholes on a single concentric circle, as well as the distance between the concentric circle and the outer edge of the receiving element 8 is an example, and the number of concentric circles may reach up to 20 circles and the number of boreholes may reach up to a total of a few hundred boreholes in the receiving element 8 depending on the dimensions of the receiving element 8 and the borehole diameter.

Figure 5:
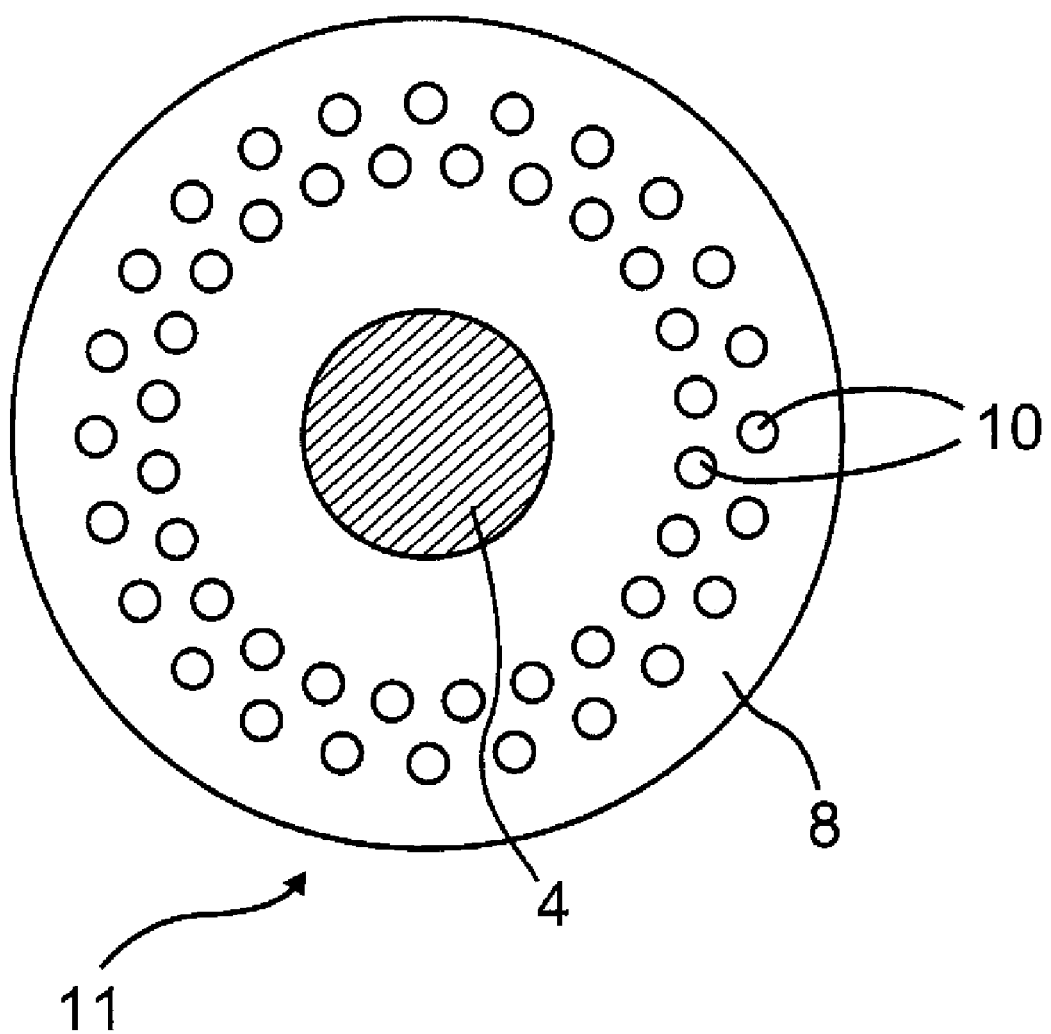
FIG. 5 is a variant according to FIG. 4 with a special borehole arrangement.

FIG. 5 shows a special variant of the arrangement 11 according to FIG. 4 of the groups of boreholes 10 in a top view. The boreholes are arranged in a plurality of partial groups radially symmetrically around the insulating block 4, two partial groups being arranged, for example, offset at closely spaced locations by a borehole diameter radially in relation to one another. This arrangement leads to the greatest possible residual stability of the receiving element 8 in case of a large number of boreholes located at closely spaced locations from one another.

Figure 6:
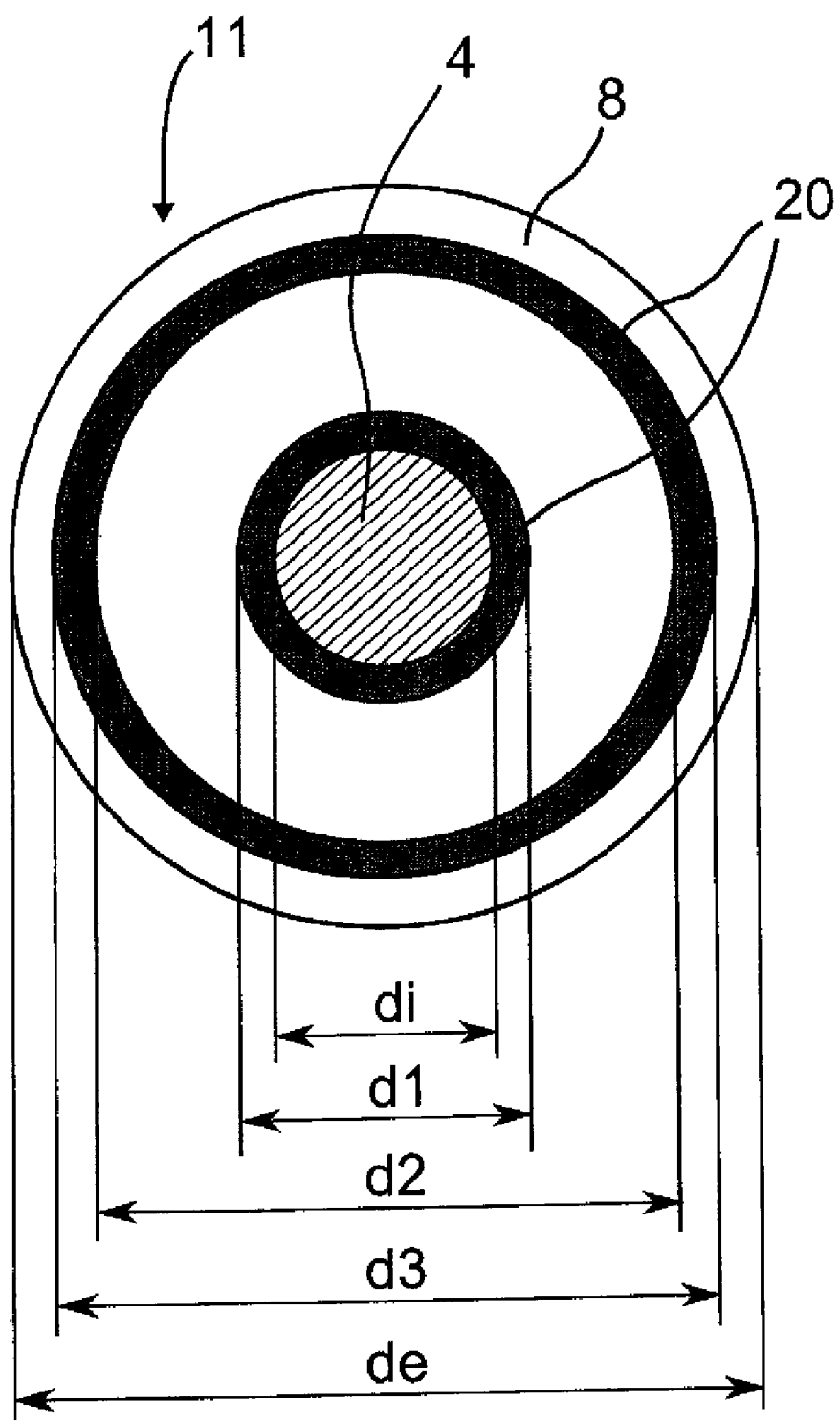
FIG. 6 is a variant according to FIG. 4 with an arrangement of concentrically arranged grooves.

FIG. 6 shows a top view of an alternative variant of an arrangement 11 according to FIG. 4, where a plurality of concentrically arranged ring-shaped grooves 20 are arranged radially symmetrically around the insulating block 4 instead of the boreholes. The ring-shaped grooves 20 are filled with a material whose thermal conductivity is lower than the thermal conductivity of the receiving element 8. The material may be air. For example, a number of two grooves 20 are shown, groove 20 being arranged directly at the insulating block 4 and another groove 20 close to the outer circumference of the receiving element 8. However, a greater number of grooves is also possible due to the dimensions of the receiving element 8 and the groove width.

The anisotropy of heat conduction is achieved by the structuring of the receiving element 8 with the grooves 20 prepared therein. An exemplary procedure for determining the dimensioning of the structuring is characterized by the sequence of the following steps:

First, the target range of the anisotropy factor is set.

The anisotropy factor describes the ratio of the vertical (axial) heat transfer coefficient to the horizontal (radial) heat transfer coefficient in the receiving element 8. The factor shall be in a range of 8 to 12 for this example.

The dimensions of the receiving element 8 are set based on the dimensions of the insulating block 4, such as the height he of the receiving element, the internal diameter di and the external diameter de.

The external boundary conditions of how the subsequent structuring of the grooves 20 can take place are preset by including the heat transfer coefficient ks of the insulating block 4 and the thermal conductivities $\lambda e$, $\lambda l$ of the receiving element 8 and of the material filled into the grooves. The number of ring-shaped grooves is preset as another condition, and it is also preset that the grooves shall be made with equal width.

The groove circle diameters d1, d2, d3 are obtained from the position of the grooves and the width of the grooves.

The following numerical example is based on an implementation with homogeneous polyethylene (PE) as the basic material of the receiving element 8. The grooves are filled with air. The dimensions are as follows: he=6 mm; di=10 mm; d1=12.82 mm; d2=23.18 mm, d3=26 mm; d4=28 mm; de=30 mm. The heat-specific material property is given as follows in this example in the case of PMMA for the insulating block 4: ks=50 W/m²K.

A value of kv=50 W/m²K is likewise selected for the vertical heat transfer coefficient kv of the receiving element 8 to obtain equal area-related vertical heat fluxes from the body surface to the environment. Based on the cylindrical geometry of the receiving element 8 (he, de, di) and the vertical heat transfer coefficient kv=50 W/m²K of the receiving element 8 selected, a value is determined in the next step for the horizontal heat transfer coefficient kl of a nonstructured receiving element by means of formula 1.

$$kl = \frac{2 \cdot kv \cdot he}{de \cdot \ln\frac{de}{di}} \qquad \text{Formula 1}$$

A value kl of 18.2 W/m²K is obtained for the horizontal heat transfer coefficient in this example.

Using formula 2, the changed horizontal heat transfer coefficient kl_s of the structured receiving element 8 can then be determined from the groove circle diameters d1, d2, d3, the internal diameter di and the external diameter de in conjunction with the thermal conductivities λe=0.4 W/mK of the receiving element and λl=0.026 W/mK for stagnant air as the filling material for the grooves.

$$kl\_s = \frac{1}{de} \cdot \frac{1}{\frac{1}{2 \cdot \lambda l} \cdot \ln\frac{d1}{di} + \frac{1}{2 \cdot \lambda e} \cdot \ln\frac{d2}{d1} + \frac{1}{2 \cdot \lambda l} \cdot \ln\frac{d3}{d2} + \frac{1}{2 \cdot \lambda e} \cdot \ln\frac{de}{d3}} \qquad \text{Formula 2}$$

At a kv of 50 W/m²K, a kl_s of 4.31 W/m²K is obtained for the structured receiving element 8 in this example. An anisotropy factor of 11.6 between the vertical heat transfer coefficient kv and the horizontal heat transfer coefficient kl_s altered by structuring is obtained from this. The degree of anisotropy can be set by varying the number and the dimensioning of the ring-shaped grooves and the materials used. A further possibility of varying the anisotropy factor is the use of at least two different filling materials for the grooves. The values of the thermal conductivities λ of the different filling materials are then to be introduced correspondingly into formula 2 in the example.

The boundary conditions given by the application and the materials suitable for use (PEEK, PE, PMMA, PC, PSU) and their combinations yield many different combinations.

After comparison with the intended target range of the anisotropy factor, a variant that is practicable for the manufacture is then selected in the target range of the anisotropy factor in iterative steps by slightly varying the geometric data d1, d2, d3. The value of the anisotropy factor, equaling 11.6, is in the target range in this example with the stipulation that further iteration steps concerning the groove width and the number of grooves are not necessary.

Figure 7:
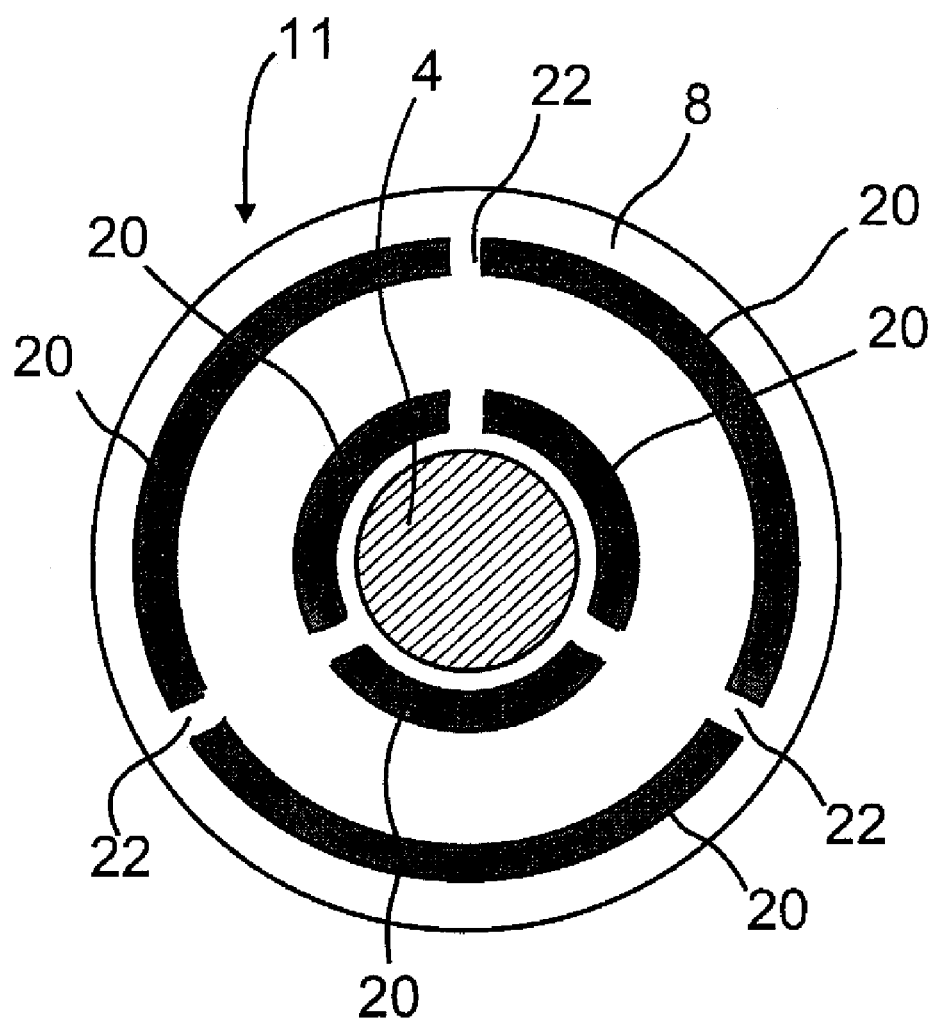
FIG. 7 is an embodiment variant according to FIG. 6 with an arrangement of support struts.

FIG. 7 shows a variant of an arrangement 11 according to FIG. 6 as a top view, where the grooves 20 are interrupted and support struts 22 are thus formed in the receiving element 8. The structure of the receiving element 8 is thus preserved, which has the advantage that no upper-side and underside layer is necessary for the mechanical stabilization. The thickness of the insulating layer 7 (FIG. 3) and of the adhesive layer 5 (FIG. 3) is thus dimensioned independently from the structure of the receiving element 8 and insulating block 4.

A number of two grooves 20 is shown as an example, both grooves being arranged at spaced locations from one another and at spaced locations from the insulating block 4 and from the outer circumference of the receiving element 8. A number of three support struts 22 is shown as an example. Due to the dimensions of the receiving element 8 and the groove widths, the number of grooves, the width of the support struts and the requirements imposed on the stability and flexibility of the receiving element, a larger number of support struts 22 may be necessary in the application. The calculation of the horizontal heat transfer coefficient of this variant is based, in principle, on the formulas presented in connection with FIG. 6, but the geometry of the support struts 22 is also included in formula 2.

Figure 8:
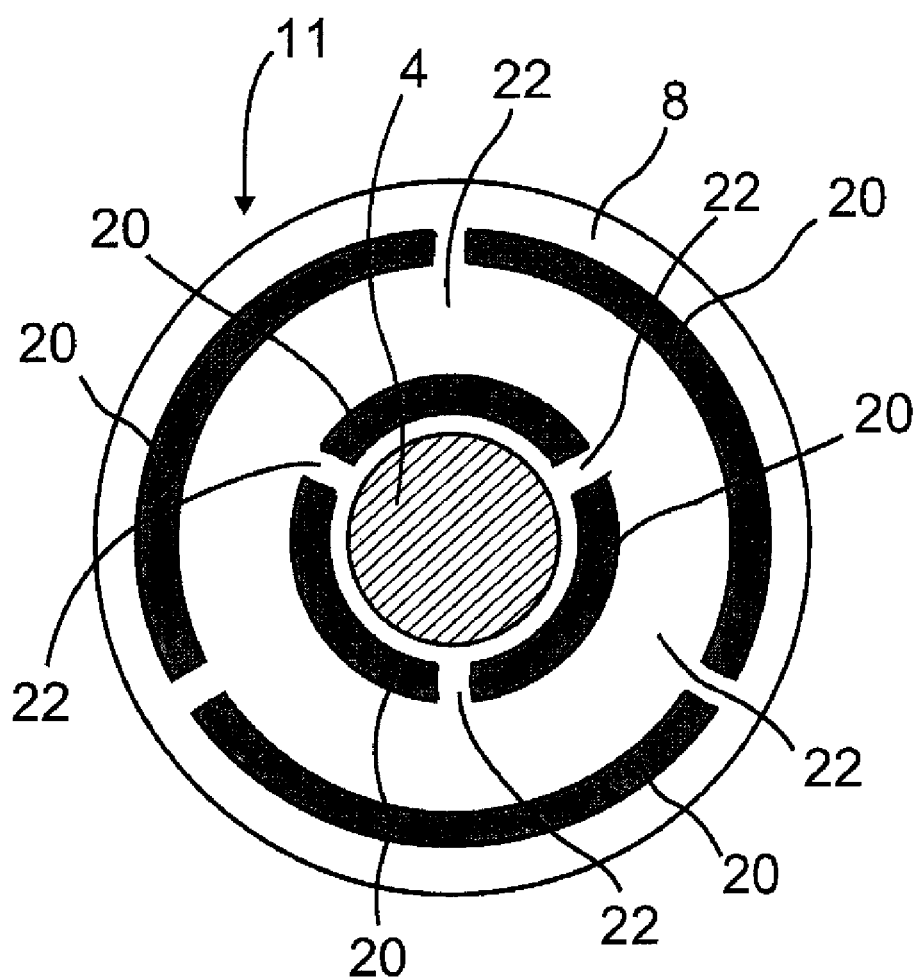
FIG. 8 is an embodiment variant according to FIG. 7 with an alternative arrangement of support struts.

FIG. 8 shows a variant of an arrangement 11 according to FIG. 7 as a top view, where the remaining support struts 22 are advantageously arranged offset in the receiving element 8 such that no horizontal heat flux can flow off to the environment from the insulating block 4 in the direct and straight direction along the support struts from the center of the insulating block 4 to the edge of the receiving element 8. An extensively homogeneous distribution of the horizontal heat flux is thus achieved despite the support struts 22. A total number of six support struts 22 arranged offset in a star-shaped pattern is shown as an example. Other arrangements of the offsetting and number of support struts 22 are possible.

While specific embodiments of the invention have been shown and described in detail to illustrate the application of the principles of the invention, it will be understood that the invention may be embodied otherwise without departing from such principles.

Appendix

List of Reference Numbers

| | |
|---|---|
| 1 | Double temperature sensor |
| 2 | First temperature sensor |
| 3 | Second temperature sensor |
| 4 | Insulating block |
| 5 | Adhesive layer |
| 6 | Electrical connections |
| 7 | Insulating layer |
| 8 | Receiving element |
| 9 | Skin surface |
| 10 | Group of vertical boreholes |
| 11 | First arrangement of a double temperature sensor |
| 12 | Second arrangement of a double temperature sensor |
| 20 | Grooves |
| 22 | Support struts |
| he | Height of receiving element |
| di | Internal diameter |
| de | External diameter |
| d1, d2, d3 | Groove circle diameters |

What is claimed is:

1. A double temperature sensor with a receiving element, suitable for detecting a skin surface temperature and an ambient temperature, the double temperature sensor with a receiving element comprising:

an insulating block defining a sensor housing;
a receiving element surrounding said insulating block;
a first temperature sensor arranged in said insulating block for detecting a skin temperature; and
a second temperature sensor arranged in said sensor housing for detecting an outer-side ambient temperature, wherein at least one of the receiving element or the insulating block define an anisotropic heat conduction material structure.

2. A double temperature sensor in accordance with claim 1, wherein the anisotropy of the heat conduction of the an anisotropic heat conduction material structure provides lower horizontal and radial heat conduction than vertical and axial heat conduction.

3. A double temperature sensor in accordance with claim 2, wherein:

the receiving element defines the anisotropic heat conduction material structure and provides a horizontal and radial heat transfer coefficient that is lower than a vertical and axial heat transfer coefficient by a factor of 2 to 20.

4. A double temperature sensor in accordance with claim 2, wherein:
the insulating block defines the anisotropic heat conduction material structure;
the anisotropy of the heat conduction in the insulating block provides a horizontal and radial heat transfer coefficient that is lower than a vertical and axial heat transfer coefficient by a factor of 2 to 20.

5. A double temperature sensor in accordance with claim 1, wherein:
the receiving element defines the anisotropic heat conduction material structure;
the anisotropy of the heat conduction in the receiving element is obtained by means of a group of vertical and axial boreholes in the receiving element.

6. A double temperature sensor in accordance with claim 1, wherein:
the receiving element defines the anisotropic heat conduction material structure;
the anisotropy of the heat conduction in the receiving element is obtained by means of vertical and axial grooves in the receiving element.

7. A double temperature sensor in accordance with claim 6, wherein the grooves are connected to the receiving element via support struts.

8. A double temperature sensor in accordance with claim 7, wherein the grooves with the support struts are arranged in an offset arrangement in the receiving element, wherein the horizontal and radial heat flux flowing from the insulating block cannot flow off in a direct and straight form along the support struts.

9. A double temperature sensor in accordance with claim 7, wherein the support struts are embossed as components of the receiving element.

10. A double temperature sensor in accordance with claim 7, wherein the support struts are prepared as additional elements connected in the receiving element.

11. A double temperature sensor in accordance with claim 1, wherein:
the receiving element defines the anisotropic heat conduction material structure;
the anisotropy of the heat conduction in the receiving element is obtained by means of one or more of a group of vertical and axial boreholes in the receiving element and vertical and axial grooves in the receiving element; and
the boreholes or the grooves are filled with a material whose thermal conductivity is lower than the thermal conductivity of a remaining portion of said receiving element.

12. A double temperature sensor in accordance with claim 1, wherein a temperature proportional to the skin surface is detected by said first temperature sensor element and a temperature proportional to the ambient air is detected by said second temperature sensor element.

13. A double temperature sensor in accordance with claim 1, wherein a material of the receiving element has a thermal conductivity between 0.05 W/mK and 0.3 W/mK.

14. A double temperature sensor in accordance with claim 13, wherein the material of the receiving element is made of a polyethylene (PE).

15. A double temperature sensor in accordance with claim 1, wherein a material of the insulating block has a thermal conductivity between 0.05 W/mK and 0.3 W/mK.

16. A double temperature sensor in accordance with claim 15, wherein the material of the insulating block is made of a polyether ether ketone (PEEK).

17. A double temperature sensor in accordance with claim 1, wherein:
the receiving element defines the anisotropic heat conduction material structure;
the anisotropy of the heat conduction in the receiving element is obtained by means of one or more of a group of vertical and axial boreholes in the receiving element and vertical and axial grooves in the receiving element; and
the material of the boreholes or grooves has a lower thermal conductivity than a remaining portion of said receiving element in the range of 0.01 W/mK to 0.1 W/mK.

18. A double temperature sensor in accordance with claim 1, wherein:
the receiving element defines the anisotropic heat conduction material structure;
the anisotropy of the heat conduction in the receiving element is obtained by means of one or more of a group of vertical and axial boreholes in the receiving element and vertical and axial grooves in the receiving element; and
at least two materials are used to fill the grooves or boreholes.

19. A double temperature sensor in accordance with claim 1, further comprising:
sensor electrical connections arranged in a straight line, helically, circularly, meandering or a zigzag- or star-shaped manner or in the form of a polygon on an underside in said receiving element.

20. A double temperature sensor in accordance with claim 19, wherein the electrical connections are embedded in a slot in the receiving element.

21. A double temperature sensor in accordance with claim 1, wherein the temperature sensors are each temperature-dependent electric resistor elements.

22. A double temperature sensor in accordance with claim 1, wherein the temperature sensors are of identical or substantially identical design.

23. A double temperature sensor in accordance with claim 1, wherein an underside surface of the insulating block is arched towards the skin surface.

* * * * *

UNITED STATES PATENT AND TRADEMARK OFFICE
CERTIFICATE OF CORRECTION

| | | |
|---|---|---|
| PATENT NO. | : 8,057,093 B2 | Page 1 of 1 |
| APPLICATION NO. | : 12/469055 | |
| DATED | : November 15, 2011 | |
| INVENTOR(S) | :Sattler | |

It is certified that error appears in the above-identified patent and that said Letters Patent is hereby corrected as shown below:

On the title page item (73) should read:

-- DRÄGER MEDICAL GMBH. --

Signed and Sealed this
Seventh Day of February, 2012

David J. Kappos
*Director of the United States Patent and Trademark Office*